United States Patent
Huang et al.

(10) Patent No.: US 12,238,162 B2
(45) Date of Patent: Feb. 25, 2025

(54) METHOD AND NON-TRANSITORY COMPUTER-READABLE STORAGE MEDIUM AND APPARATUS FOR LOAD BALANCING OF NETWORK PROCESSING UNIT

(71) Applicant: Airoha Technology (Suzhou) Limited, Suzhou (CN)

(72) Inventors: Weihua Huang, Nanjing (CN); Fei Yan, Nanjing (CN)

(73) Assignee: AIROHA TECHNOLOGY (SUZHOU) LIMITED, Suzhou (CN)

( * ) Notice: Subject to any disclaimer, the term of this patent is extended or adjusted under 35 U.S.C. 154(b) by 37 days.

(21) Appl. No.: 18/114,778

(22) Filed: Feb. 27, 2023

(65) Prior Publication Data
US 2024/0121295 A1    Apr. 11, 2024

(30) Foreign Application Priority Data
Sep. 30, 2022    (CN) .......................... 202211215701.8

(51) Int. Cl.
*G06F 15/173* (2006.01)
*H04L 67/1008* (2022.01)
*H04L 67/1021* (2022.01)

(52) U.S. Cl.
CPC ...... *H04L 67/1008* (2013.01); *H04L 67/1021* (2013.01)

(58) Field of Classification Search
CPC .................. H04L 67/1008; H04L 67/1021
USPC ....................................................... 709/224
See application file for complete search history.

(56) References Cited

U.S. PATENT DOCUMENTS

| | | | |
|---|---|---|---|
| 8,788,570 B2 * | 7/2014 | Goel | H04L 45/745 709/228 |
| 9,218,203 B2 * | 12/2015 | Yu | H04L 47/2441 |
| 9,565,167 B2 * | 2/2017 | Roch | H04L 47/125 |
| 9,756,151 B2 * | 9/2017 | Goel | H04L 69/22 |
| 9,935,881 B2 * | 4/2018 | Tang | H04L 47/125 |
| 10,305,822 B2 * | 5/2019 | Tao | H04L 49/552 |
| 10,511,479 B2 * | 12/2019 | Xie | G06F 9/45558 |
| 10,979,293 B2 * | 4/2021 | Xie | H04L 41/082 |
| 11,586,479 B2 * | 2/2023 | Wei | H04L 67/1008 |
| 2009/0158297 A1 * | 6/2009 | Lee | G06F 9/505 719/313 |

(Continued)

FOREIGN PATENT DOCUMENTS

| | | |
|---|---|---|
| CN | 102483707 B | 8/2015 |
| WO | WO 2011/005390 A2 | 1/2011 |

*Primary Examiner* — Alicia Baturay
(74) *Attorney, Agent, or Firm* — Birch, Stewart, Kolasch & Birch, LLP (57) ABSTRACT

The invention relates to a method, a non-transitory computer-readable storage medium, and an apparatus for load balancing of a network processing unit (NPU). A central processing unit (CPU) is coupled to the NPU and the NPU has multiple cores. The method, which is performed by the CPU, includes: reassigning a data stream processed by a first core in the NPU, which is under a high load, to a second core in the NPU, which is under a low load, where the low load is lower than the high load. The data stream is distinguished from other data streams by at least its quintuple, and the quintuple is composed of a source Internet Protocol (IP) address, a source port, a destination IP address, a destination port and a protocol type.

17 Claims, 9 Drawing Sheets

(56) References Cited

U.S. PATENT DOCUMENTS

| | | | |
|---|---|---|---|
| 2009/0248934 A1* | 10/2009 | Ge | G06F 9/4812 710/261 |
| 2011/0087814 A1* | 4/2011 | Liu | G06F 9/4812 710/260 |
| 2013/0138920 A1* | 5/2013 | Ge | H04L 47/2441 712/30 |

* cited by examiner

METHOD AND NON-TRANSITORY COMPUTER-READABLE STORAGE MEDIUM AND APPARATUS FOR LOAD BALANCING OF NETWORK PROCESSING UNIT

CROSS-REFERENCE TO RELATED APPLICATIONS

This application claims the benefit of priority to Patent Application No. 202211215701.8, filed in China on Sep. 30, 2022; the entirety of which is incorporated herein by reference for all purposes.

BACKGROUND

The disclosure generally relates to load balancing and, more particularly, to a method, a non-transitory computer-readable storage medium and an apparatus for load balancing of a network processing unit (NPU).

The NPU is an integrated circuit, which can be programmed by software, and is dedicated in the networking equipment. An algorithm which runs on the NPU mainly includes varies functions of data packet processing for repeatedly receiving packets through one port, decapsulating packets in conformity to the reception protocol, processing data from the decapsulated ones, encapsulating the processed data into packets in conformity to the transmission protocol, and transmitting the data packets out through another port. With the rapid development of network applications, the performance requirements of NPU are higher, therefore improving the performance of NPU is the primarily task at present.

SUMMARY

The disclosure relates to an embodiment of a method for load balancing of a network processing unit (NPU). A central processing unit (CPU) is coupled to the NPU and the NPU has multiple cores. The method, which is performed by the CPU, includes: reassigning a data stream processed by a first core in the NPU, which is under a high load, to a second core in the NPU, which is under a low load, where the low load is lower than the high load.

The disclosure further relates to an embodiment of a non-transitory computer-readable storage medium having stored therein program code that, when loaded and executed by a CPU, causes the CPU to perform the above method for load balancing of an NPU.

The disclosure further relates to an embodiment of an apparatus for load balancing of an NPU to include the NPU and a CPU. The NPU includes multiple cores. The CPU is arranged operably to: reassign a data stream processed by a first core in the NPU, which is under a high load, to a second core in the NPU, which is under a low load, where the low load is lower than the high load.

The data stream is distinguished from other data streams by at least its quintuple, and the quintuple is composed of a source Internet Protocol (IP) address, a source port, a destination IP address, a destination port and a protocol type.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words described the relationship between elements should be interpreted in a like fashion (e.g., "between" versus "directly between," "adjacent" versus "directly adjacent." etc.)

Current network equipment is usually equipped with both a central processing unit (CPU) and a network processing unit (NPU) and these two types of processors are responsible for performing different tasks. The NPU is a high-speed programmable processor dedicated to packet processing and forwarding, and provides a more efficient and flexible solution for a wide range of packets. As network applications become increasingly diverse and the amount of transmitted data becomes increasingly large, the single-core NPU cannot meet the requirements of data processing speed; thus, more and more network equipment is equipped with the multi-core NPU to perform operations for processing and forwarding various packets. In order to take advantage of parallel processing with the multi-core NPU, the CPU usually executes a load balancing algorithm to avoid an unbalanced situation where some cores are too busy while others are idle. In some implementations, the load balancing algorithm is employed to allow specific service of packets, such as Virtual eXtensible Local Area Network (VXLAN), Layer 2 Tunneling Protocol (L2TP), WiFi, Internet Protocol Security (IPSec), Segment Routing Ipv6 (SRv6), and so on, are processed by dedicated cores. For example, the first core in the NPU is arranged to deal with WiFi packets, the second core in the NPU is arranged to deal with VXLAN packets, the third core in the NPU is arranged to deal with L2TP packets, and so on. However, when service data flows are significantly different from each other in data volumes, multiple cores in the NPU would experience severe load imbalance, seriously affecting the overall performance of the NPU.

To address the problems as described above, an embodiment of the present invention introduces a method for load balancing of the NPU, which uses a finer load balancing assignment strategy to improve the overall performance of the NPU. Although the specification describes the shortcomings of the above implementation, this is only used to illustrate the inspiration of the embodiments of the present invention. Those artisans can apply the technical solutions as follows to solve other technical problems or be applicable to specific technical environments, and the invention should not be limited thereto.

Figure 1:
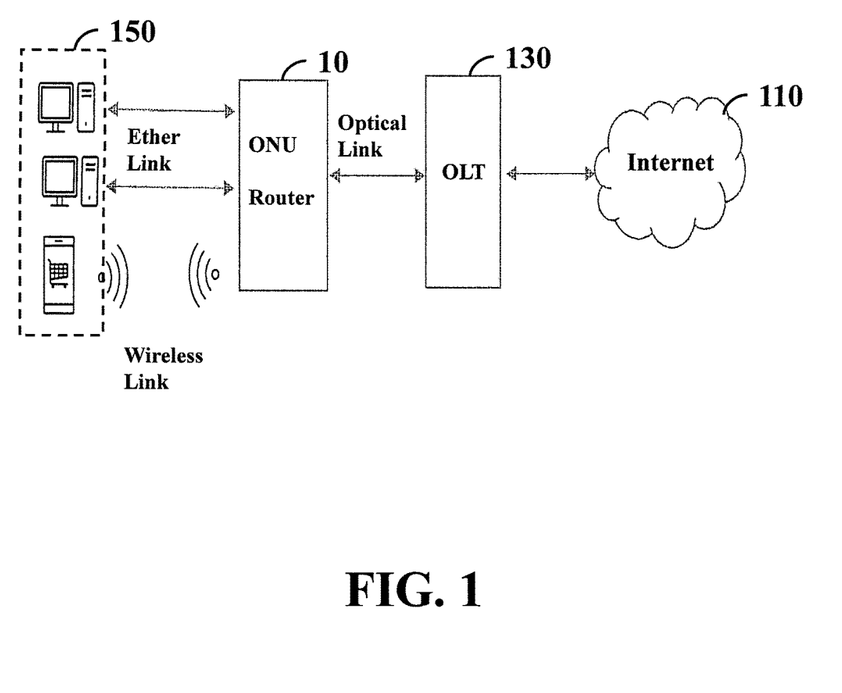
FIG. 1 is a schematic diagram illustrating a passive optical network (PON) according to an embodiment of the present invention.

In some embodiments, the method for load balancing of the NPU may be applied in Optical Network Units (ONUs). Refer to FIG. 1 showing a schematic diagram of a passive optical network (PON). The PON consists of the optical line terminal (OLT) 130 at the service provider's central control room, and a number of optical network units (ONUs), such as the ONU router 10. The OLT 130 provides two main functions: to perform conversion between the electrical signal used by the service provider's equipment and the fiber-optic signal used by the PON; and to coordinate the multiplexing between the ONUs on the other end of the PON. The OLT 130 and the ONU router 10 are connected to each other by an optical link. The ONU router 130 is a user-end equipment of the PON system, which can be installed in a home for interconnection with the user devices 150 using ether links and/or wireless links. The user device 150 may be a Personal Computer (PC), a laptop PC, a tablet PC, a mobile phone, a digital camera, a digital recorder, a smart television, a smart air conditioner, a smart refrigerator, a smart range hood, or other consumer electronic products. With the collocation of the OLT 130, the ONU router 10 provides various broadband services to the connected user devices 250, such as Internet surfing, Voice over Internet Protocol (VoIP) communications, high-quality video, etc.

Figure 2:
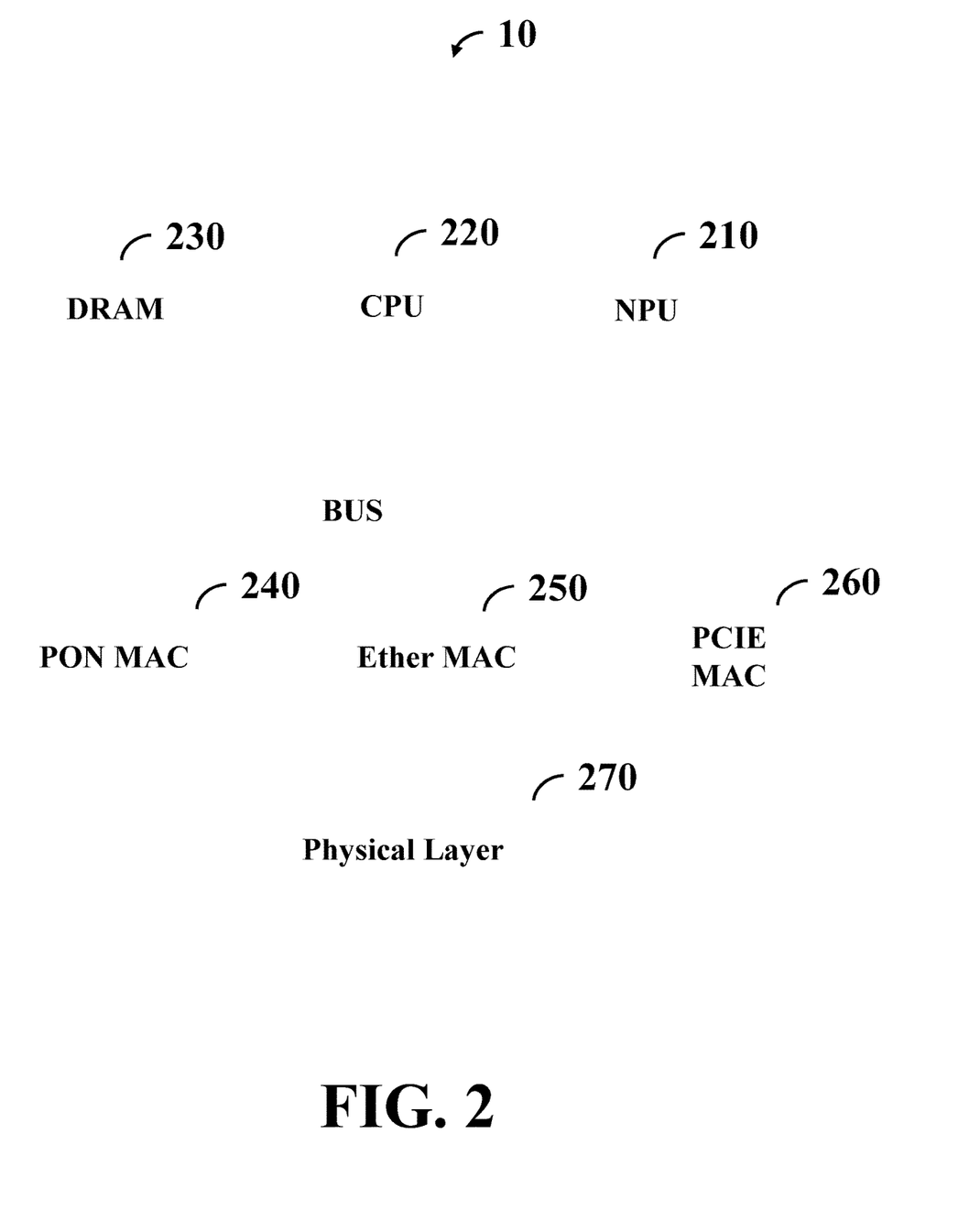
FIG. 2 is the system architecture of an Optical Network Unit (ONU) router according to an embodiment of the present invention.

Refer to FIG. 2 showing the system architecture of the ONU router 10. The ONU router 10 includes the multi-core NPU 210, the Central Processing Unit (CPU) 220, the Dynamic Random Access Memory 230, the PON Media Access Control (MAC) 240, the Ether MAC 250, the Peripheral Component Interconnect Express (PCIE) MAC 260, which are coupled to each other by the shared bus architecture. The shared bus architecture facilitates the transmissions of data, addresses, control signals, etc. between the above components. The bus architecture includes a set of parallel physical-wires and is a shared transmission medium so that only two devices can access to the wires to communicate with each other for transmitting data at any one time. Data and control signals travel bidirectionally between the components along data and control lines, respectively. Addresses on the other hand travel only unidirectionally along address lines. For example, when the NPU 210 prepares to read data from a particular address of the DRAM 230, the NPU 210 sends this address to the DRAM 230 through the address lines. The data of that address is then returned to the NPU 210 through the data lines. To complete the data read operation, control signals are sent along the control lines.

The CPU 220 may be implemented in numerous ways, such as with general-purpose hardware (e.g., a single processor, multiple processors or graphics processing units capable of parallel computations, or others) that is programmed using software instructions to perform the functions recited herein. The multi-core NPU 210 includes one or more integrated circuits (ICs) and each core has a feature set specifically targeted at the networking application domain. The multi-core NPU 210 is a software programmable device, has generic characteristics similar to general purpose processing unit, and is commonly used in processing packets interchanged between different types of networks, such as PON, Ethernet, Wireless Local Area Network (WLAN), Personal Access Network (PAN), and the like, for improving the overall performance of ONU router 10. The DRAM 230 allocates space as a data buffer for storing messages that are received through ports corresponding to different types of networks, and are to be sent out through ports corresponding to different types of networks. The DRAM 230 further stores necessary data in executions by the multi-core NPU 210, such as variables, flags, data tables, and so on. The PON MAC 240 is coupled to a corresponding circuitry of the physical layer 270 for driving the corresponding circuitry (may include an optical receiver and an optical transmitter) to generate a series of optical signal interchanges with the OLT 130, so as to receive and transmit packets from and to the OLT 130 through the optical link. The Ether MAC 250 is coupled to a corresponding circuitry of the physical layer 270 for driving the corresponding circuitry (niay include a digital receiver and a digital transmitter) to generate a series of electrical signal interchanges with the user device 150, so as to receive and transmit packets from and to the user device 150 through the Ether link. The PCIE MAC 260 is coupled to a corresponding circuitry of the physical layer 270 for driving the corresponding circuitry (may include a radio frequency (RF) receiver and an RF transmitter) to generate a series of RF signal interchanges with the user device 150, so as to receive and transmit packets from and to the user device 150 through the wireless link. The wireless link may be established with a wireless communications protocol, such as 802.11x, Bluetooth, etc.

Figure 3:
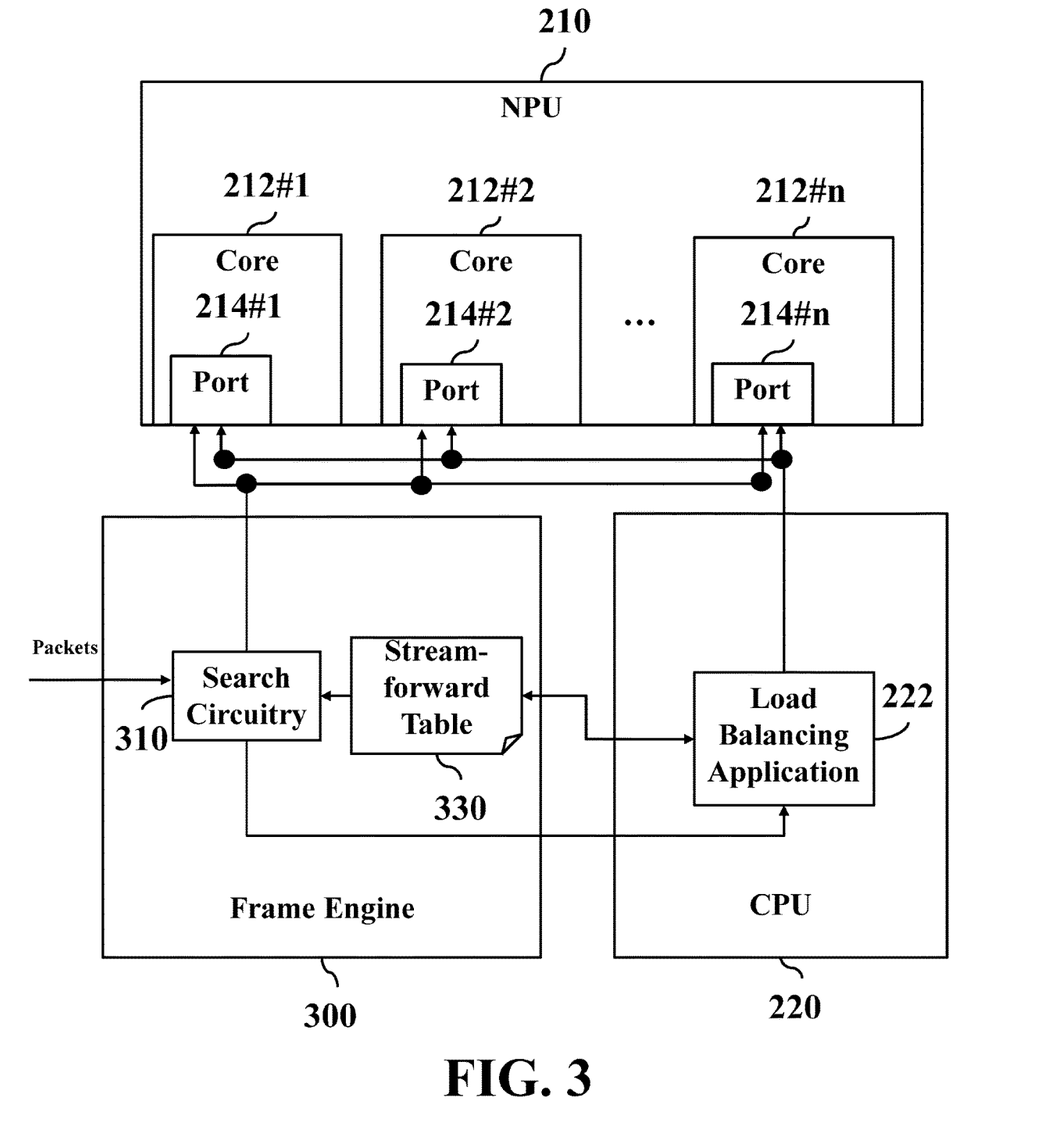
FIG. 3 is a block diagram of a load balancing system according to an embodiment of the present invention.

Refer to FIG. 3 showing the block diagram of a load balancing system. The load balancing system includes the multi-core NPU 210, the CPU 220 and the frame engine 300. The NPU 210 includes cores 212 #1 to 212 #n and each core includes a port. For example, the core 212 #1 includes the port 214 #1, the core 212 #2 includes the port 214 #2, and so on. Each port may include a packet queue. The search circuitry 310, and the load balancing application 222 which runs on the CPU 220 may push packets to be processed into the packet queue. The packet includes the packet header and payload. The packet header carries the profile of this packet and the payload carries data. The profile includes such as a source Internet Protocol address (SIP), a source port (SP), a destination IP address (DIP), a destination port (DP), a protocol type, etc., enabling the corresponding core to perform designated forwarding operations according to the profiles of these packets popped out of the packet queue.

The frame engine 300 includes the search circuitry 310 and the stream-forward table 330 that is stored in an allocated space of a Static Random Access Memory (SRAM). The stream-forward table 330 contains multiple entries and each entry stores mapping information of data streams to designated cores. Each data stream is classified according to the quintuple as a basis and the quintuple includes SIP, SP, DIP, DP and protocol type. Each data stream has a unique quintuple. Exemplary stream-forward table 330 is shown in Table 1:

TABLE 1

| Stream Index | Import SIP/SP | Import DIP/DP | Protocol Type | Forward Interface |
|---|---|---|---|---|
| 1520 | 192.168.1.3/36692 | 192.168.50.81/4789 | VXLAN | #2 |
| 2273 | 192.168.1.10/35336 | 192.168.40.2/1701 | L2TP | #1 |

Table 1 contains two entries. The first entry indicates, if a to-be-processed packet has the import SIP/SP as 192.168, 1.3/36692, the import DIP/DP as 192.168.50.81/4789 and the protocol type as VXLAN, then this packet is forwarded to the port 214 #2 of the core 212 #2. The second entry indicates, if a to-be-processed packet has the import SIP/SP as 192.168,1.10/35336, the import DIP/DP as 192.168.40.2/1701 and the protocol type as L2TP, then this packet is forwarded to the port 214 #1 of the core 212 #1.

The search circuitry 310 receives numerous packets from the PON MAC 240, the Ether MAC 250 and the PCIE MAC 260. The search circuitry 310 compares the profile carried in the header of each packet with the entries of the stream-forward table 330 to determine whether there have been an applicable and specific core to process data carried in each packet. If the profile carried in the header of an packet matches any entry of the stream-forward table 330, it means that there have been an applicable and specific core to process data of this packet and the search circuitry 310 pushes this packet into the packet queue in the port of the specific core. If the profile carried in the header of one packet does not match any entry of the stream-forward table 330, it means that there have been no applicable and specific core to process data of this packet (i.e., the data stream including this packet is newly detected) and the search circuitry 310 sends this packet to the load balancing application 222 running on the CPU 220. The load balancing application 222 determines a core for the new data stream according to the load balancing assignment strategy and the profile carried in this packet, pushes this packet into the packet queue in the port of the determined core, generates a new entry describing the mapping information of the new data stream to the determined core, and stores the new entry in the stream-forward table 330. The updated stream-forward table 330 is shown in Table 2 as an example:

TABLE 2

| Stream Index | Import SIP/SP | Import DIP/DP | Protocol Type | Forward Interface |
|---|---|---|---|---|
| 1520 | 192.168.1.3/36692 | 192.168.50.81/4789 | VXLAN | #2 |
| 2273 | 192.168.1.10/35336 | 192.168.40.2/1701 | L2TP | #1 |
| 1530 | 192.168.100.30/36692 | 192.168.50.81/4789 | VXLAN | #3 |

The newly added third entry indicates, if a to-be-processed packet has the import SIP/SP as 192.168,100.30/36692, the import DIP/DP as 192.168.50.81/4789 and the protocol type as VXLAN, then this packet is forwarded to the port 214 #3 of the core 212 #3.

Figure 4:
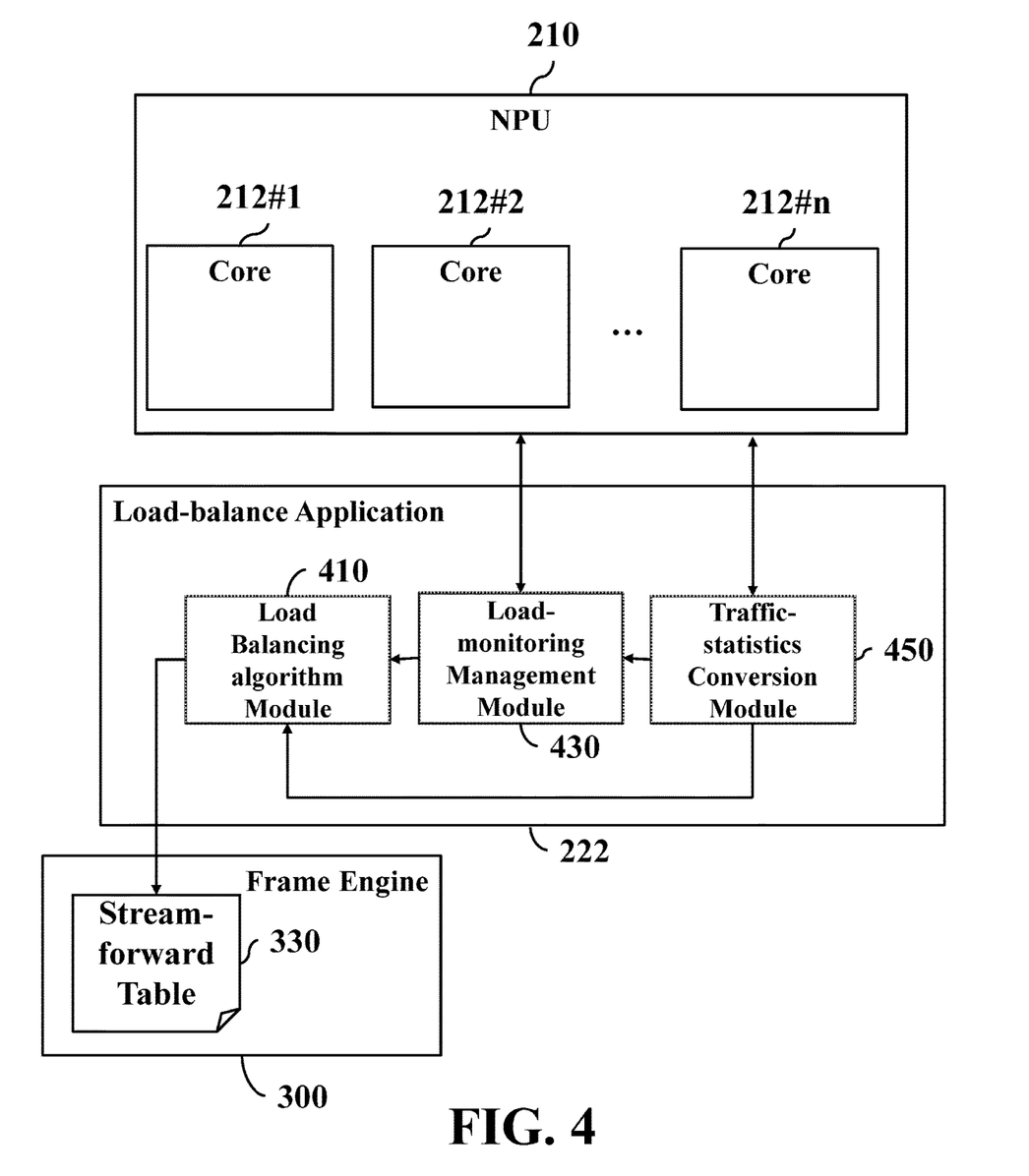
FIG. 4 is a schematic diagram for interactions between modules in a load balancing application and other components according to an embodiment of the present invention.

Refer to FIG. 4 showing a schematic diagram illustrating interactions between modules in the load balancing application 222 and other components. The load balancing application 222 includes the load balancing algorithm module 410, load-monitoring management module 430 and the traffic-statistics conversion module 450.

Figure 5:
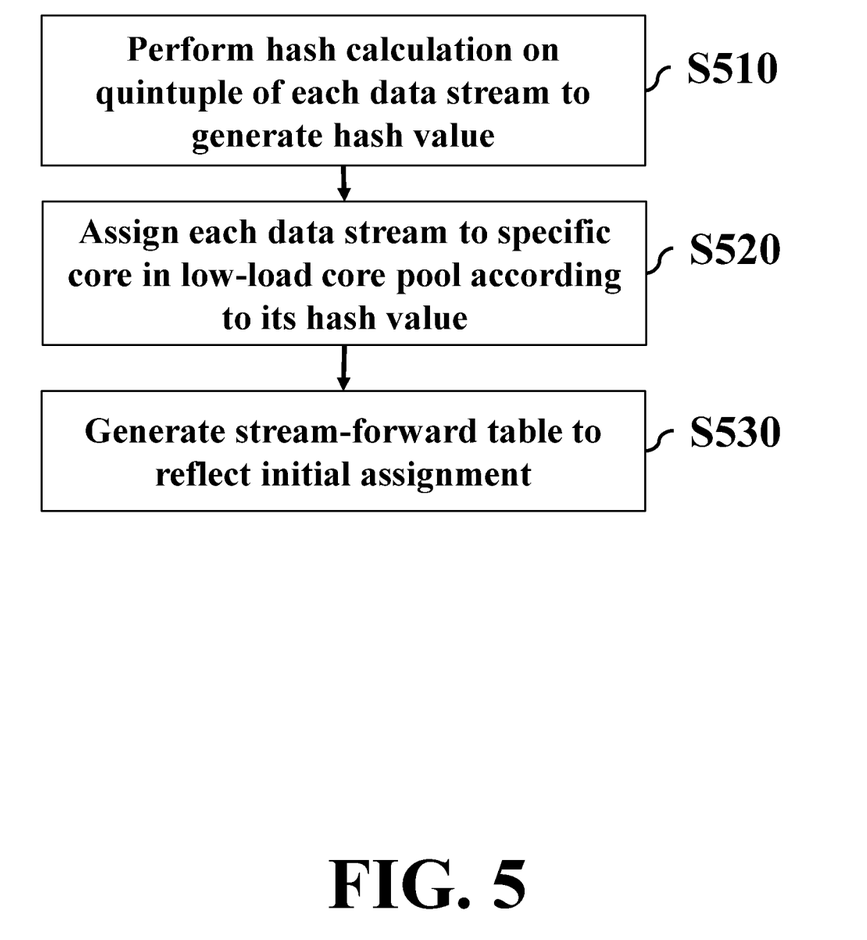
FIG. 5 is a flowchart illustrating a method for the initial assignment according to an embodiment of the present invention.

The CPU 220 may load and execute the program code of the load balancing algorithm module 410 for initially assigning each data stream to a core in a low-load core pool. The cores in the low-load core pool are preferentially selected by the load balancing algorithm module 410 to process new data streams (that is, data streams that do not recorded in the stream-forward table 330). Initially, the low-load threshold THL is set to 50% and the low-load core pool includes identifiers (IDs) of all cores 212 #1 to 212 #n to indicate that all cores 212 #1 to 212 #n are under the low-load status. The low-load threshold THL is used to distinguish the cores that are under the low-load status from the others in the multi-core NPU 210. The high-load threshold THH is used to distinguish the cores that are under the high-load status from the others in the multi-core NPU 210. Any core whose loading is lower than the low-load threshold THL is under the low-load status. Any core whose loading is higher than the high-load threshold THH is under the high-load status. Refer to FIG. 5 illustrating a method for the initial assignment, which is practiced by the CPU 220 when loading and executing the program code of the load balancing algorithm module 410. Detailed operations are described as follows:

Step S510: The hashing calculation is performed on the quintuple of each data stream to generate a hash value.

Step S520: Each data stream is assigned to a specific core in the low-load core pool according to its hash value. The assignment of each data streams to one low-load core may be calculated by the formula as follows:

$$hashID_i = hashVAL_i \% A, \ i=1,2,\ldots,n$$

$hashID_i$ indicates a core number of the core, which the $i^{th}$ data stream is assigned to, in the low-load core pool; $hashVAL_i$ indicates the hash value of the $i^{th}$ data stream; % indicates the remainder operator; A indicates the total number of cores in the low-load core pool; n indicates the total number of the data streams that are processed currently. For example, in the case that the hash value of the $i^{th}$ data stream is 5 and the total number A of cores in the low-load core pool is 3, $hashID_i$ is 2 (5/3=1 . . . 2), that is, the $i^{th}$ data stream is assigned to the second core in the low-load core pool.

Step S530: The stream-forward table 330 is generated to reflect the initial assignment. The assignment outcomes may refer to the example as shown in FIG. 1.

Figure 6:
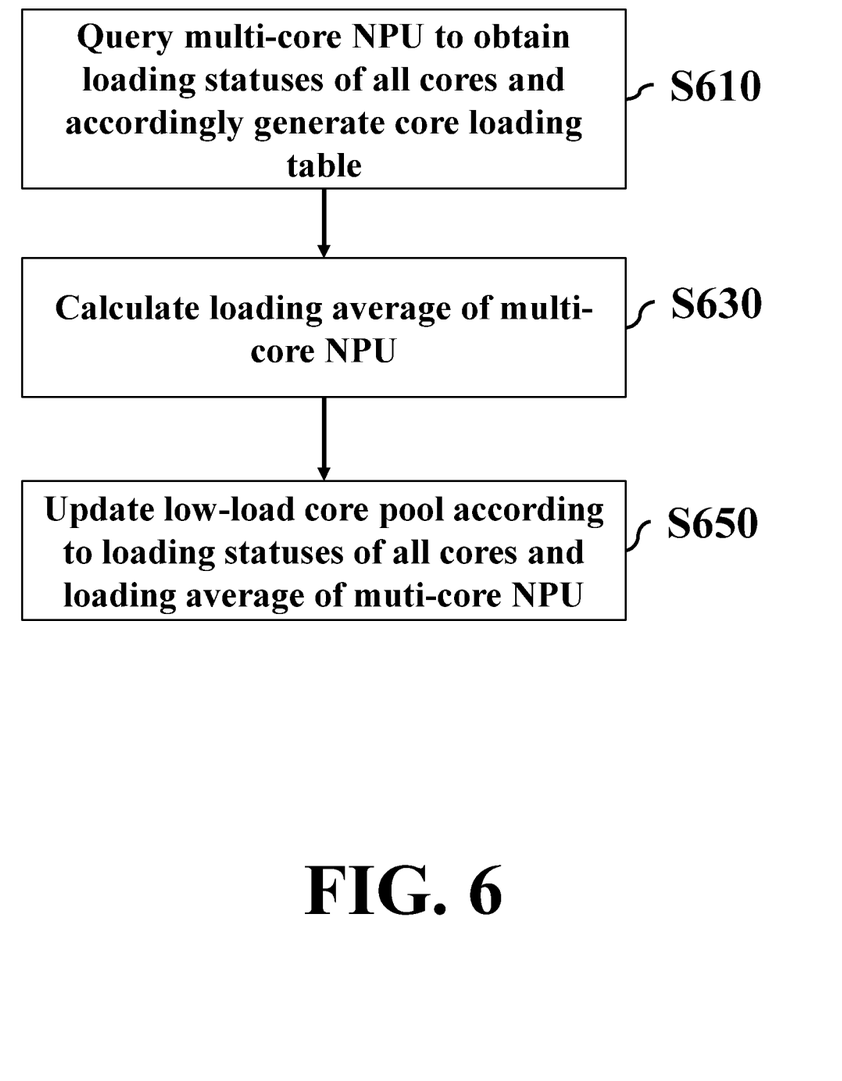
FIG. 6 is a flowchart illustrating a method for managing the load-monitoring according to an embodiment of the present invention.

The CPU 220 may periodically load and execute the program code of the load-monitoring management module 430 to maintain the low-load core pool according to the loadings of the cores 212 #1 to 212 #n in the multi-core NPU 210. Refer to FIG. 6 illustrating a method for managing the load-monitoring, which is practiced by the CPU 220 when loading and executing the program code of the load-monitoring management module 430. Detailed operations are described as follows:

Step S610: At the beginning of each iteration, the application programming interface (API) "Get_Core_Usage( )" is called to query the multi-core NPU 210 for the loading (i.e., the busy status, expressed by the usage percentage %) of each core therein. The API "Get_Core_Usage( )" may be provided by the manufacturer of the multi-core NPU 210. The load-monitoring management module 430 generates the core loading table according to the reply data from the multi-core NPU 210. The core loading table is shown in Table 3 as an example:

TABLE 3

| Core ID | Core-loading Status (%) |
|---------|------------------------|
| 1 | 63 |
| 2 | 70 |
| . | . |
| . | . |
| . | . |
| 5 | 10 |
| . | . |
| . | . |
| . | . |
| n | 89 |

The core loading table contains n entries, the first entry stores the core-loading status of the core 212 #1 as "63%", the second entry stores the core-loading status of the core 212 #2 as "70%", and so on.

Step S630: The loading average of the multi-core NPU 210 is calculated. The load-monitoring management module 430 may calculate the loading average of the multi-core NPU 210 by using a formula as follows:

$$AVGcore = \frac{\sum_{i=1}^{n} LOADi}{n}$$

AVGcore indicates the loading average of the multi-core NPU 210; n is the preset constant to indicate the total number of cores in the multi-core NPU 210; LOADi indicates the core-loading status of the $i^{th}$ core 212 #i.

Step S650: The low-load core pool is updated according to the loading statuses of all cores 212 #1 to 212 #n and the loading average of the multi-core NPU 210. In some embodiments, the load-monitoring management module 430 may clear the low-load core pool, and subsequently determines whether the loading average AVGcore of the multi-core NPU 210 is higher than 50%. If the loading average AVGcore of the multi-core NPU 210 is higher than or equal to 50%, then the load threshold TH is set to the loading average AVGcore of the multi-core NPU 210. If the loading average AVGcore of the multi-core NPU 210 is lower than 50%, then the load threshold TH is set to 50%. Subsequently, the load-monitoring management module 430 adds the IDs of the cores whose loading statuses are lower than the load threshold TH to the low-load core pool.

Figure 7:
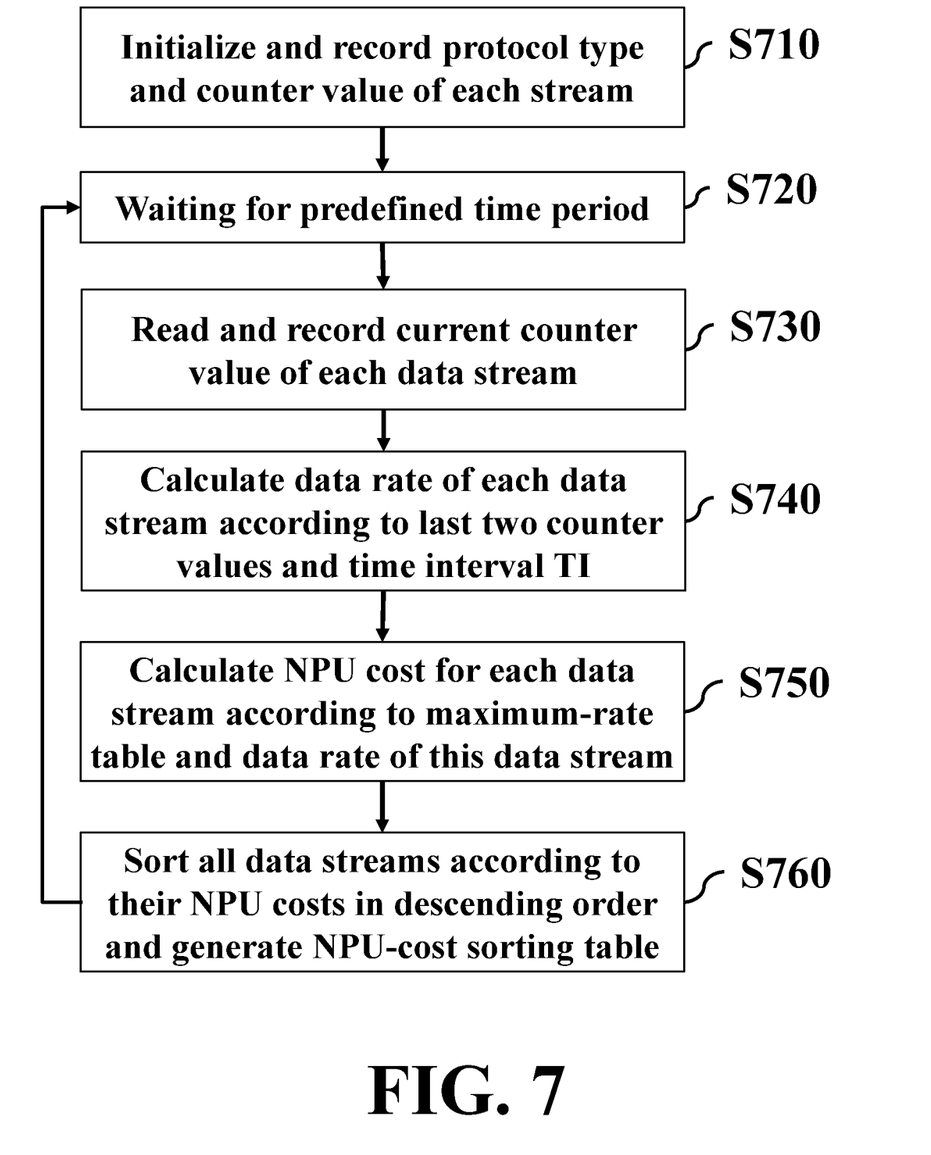
FIG. 7 is a flowchart illustrating a method for periodically counting traffics of each data stream and converting the traffics thereof into a NPU cost according to an embodiment of the present invention.

The CPU 220 may periodically load and execute the program code of the traffic-statistics conversion module 450 to count a traffic of each data stream forwarded through the multi-core NPU 210 and convert the traffic of each data stream into a cost spent by the multi-core NPU 210. Refer to FIG. 7 illustrating a method for periodically counting traffics of each data stream and converting the traffics thereof into a NPU cost, which is practiced by the CPU 220 when loading and executing the program code of the traffic-statistics conversion module 450. Detailed operations are described as follows:

Step S710: The protocol type and the counter value of each data stream are initialized and recorded. Refer to the examples as shown in Table 2, in which contains three different data streams. Each data stream is associated with an independent counter, which is initiated as 0. The counter is increased by one when the corresponding data stream is forwarded through the designated core in the multi-core NPU 210. The initiated traffic table is shown in Table 4 as an example:

TABLE 4

| Time Point | Stream Index | Protocol Type | Counter Value (Packets) |
|------------|--------------|---------------|------------------------|
| t(0) | 1520 | VXLAN | 0 |
| t(0) | 2273 | L2TP | 0 |
| t(0) | 1530 | VXLAN | 0 |

Subsequently, the loop (steps S720 to S760) is repeatedly executed to obtain the forwarded packet quantity of each data stream in a predefined time interval TI and update the NPU-cost sorting table accordingly as an execution basis of the load balance algorithm module 410.

Step S720: Waiting for a predefined time interval TI.

Step S730: The current counter value of each data stream is read and recorded. The updated traffic table is shown in Table 5 as an example:

TABLE 5

| Time Point | Stream Index | Protocol Type | Counter Value (Packets) |
|------------|--------------|---------------|------------------------|
| t(0) | 1520 | VXLAN | 0 |
| t(0) | 2273 | L2TP | 0 |
| t(0) | 1530 | VXLAN | 0 |
| t(1) | 1520 | VXLAN | 25200 |
| t(1) | 2273 | L2TP | 48000 |
| t(1) | 1530 | VXLAN | 10000 |

Step S740: The data rate of each data stream is calculated according to the last two counter values and the time interval TI. The data rate of each data stream may be calculated by the formula as follows:

$$Fr_i = (Cnt_{i,t(j)} - Cnt_{i,t(j-1)})/TI, \; i=1,2,\ldots,n$$

$Fr_i$ indicates the data rate of the $i^{th}$ data stream; $Cnt_{i,t(j)}$ indicates the quantity of packets of the $i^{th}$ data stream that have been forwarded at the current time point; $Cnt_{i,t(j-1)}$ indicates the quantity of packets of the $i^{th}$ data stream that have been forwarded at the previous time point; TI indicates the time interval from the previous time point to the current time point. The larger the calculated value of data rate, the more computing resources in the multi-core NPU 210 the data stream occupies. Refer to the example as shown in Table 5, assume that TI is set to one second: The data rate of the data stream (indexed as 1520) is 25200 packets per second (pps); the data rate of the data stream (indexed as 2273) is 48000 pps; the data rate of the data stream (indexed as 1530) is 10000 pps.

Step S750: The NPU cost for each data stream is calculated according to the maximum-rate table and the data rate of this data stream. The maximum-rate table includes multiple entries and each entry stores the maximum capacity (in pps) for processing packets of one designated tunneling protocol by any core in the multi-core NPU 210. The entries in the maximum-rate table are the result of extensive experiments and may be stored in non-volatile storage space. The maximum-rate table is shown in Table 6 as an example:

TABLE 6

| Protocol Type | Maximum Capacity (pps) |
|---|---|
| VXLAN | 120000 |
| L2TP | 150000 |

The maximum-rate table describes that the maximum capacity of any core in the multi-core NPU 210 for processing VXLAN packets and L2TP packets are 120000 pps and 150000 pps, respectively. The NPU cost of each data stream may be calculated by the formula as follows:

$$C_i = Fr_i / MAXp, i=1,2,\ldots,n$$

$C_i$ indicates the NPU cost of the $i^{th}$ data stream; $Fr_i$ indicates the data rate of the $i^{th}$ data stream; MAXp indicates the maximum capacity for processing packets with the protocol type corresponding to the $i^{th}$ data stream; i is an integer ranging from 1 to n; n is the total number of data streams currently being processed. Following the examples as shown in Tables 5 and 6, The NPU cost table is shown in Table 7 as an example:

TABLE 7

| Stream Index | NPU Cost (%) |
|---|---|
| 1520 | 21 |
| 2273 | 32 |
| 1530 | 8.3 |

Step S760: All data streams are sorted according to their NPU costs in descending order and the NPU-cost sorting table is generated. Following the example as shown in Table 7, the NPU-cost sorting table is shown in Table 8 as an example:

TABLE 8

| Stream Index | NPU Cost (%) |
|---|---|
| 2273 | 32 |
| 1520 | 21 |
| 1530 | 8.3 |

Figure 8:
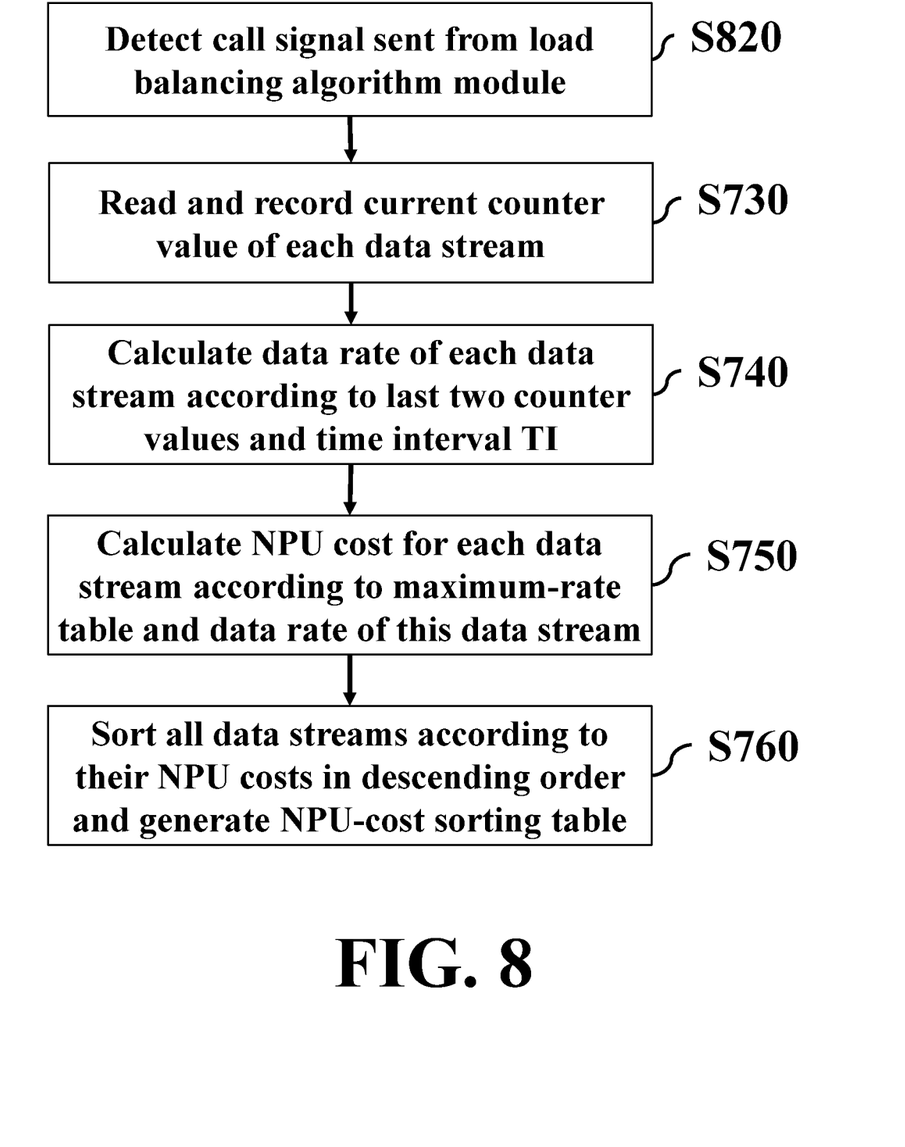
FIG. 8 is a flowchart illustrating a method for counting traffics of each data stream and converting the traffics thereof into NPU costs in real-time according to an embodiment of the present invention.

In alternative embodiments, the traffic-statistics conversion module 450 may provide the function of real-time traffic statistics, which is used to enable the load balancing algorithm module 410 to obtain the latest NPU-cost sorting table immediately. Refer to FIG. 8 illustrating a method for counting traffics of each data stream and converting the traffics thereof into an NPU cost in real-time. After detecting the call signal sent from the load balancing algorithm module 410 (step S820), the process proceeds to generate the NPU-cost sorting table (steps S730 to S760). For technical details of steps S730 to S76, reference may be made to the relevant description in FIG. 7, and details are not repeated for brevity.

In further alternative embodiments, after detecting the call signal sent from the load balancing algorithm module 410, the process directly provides the latest NPU-cost sorting table, rather than immediately regenerating it.

Figure 9:
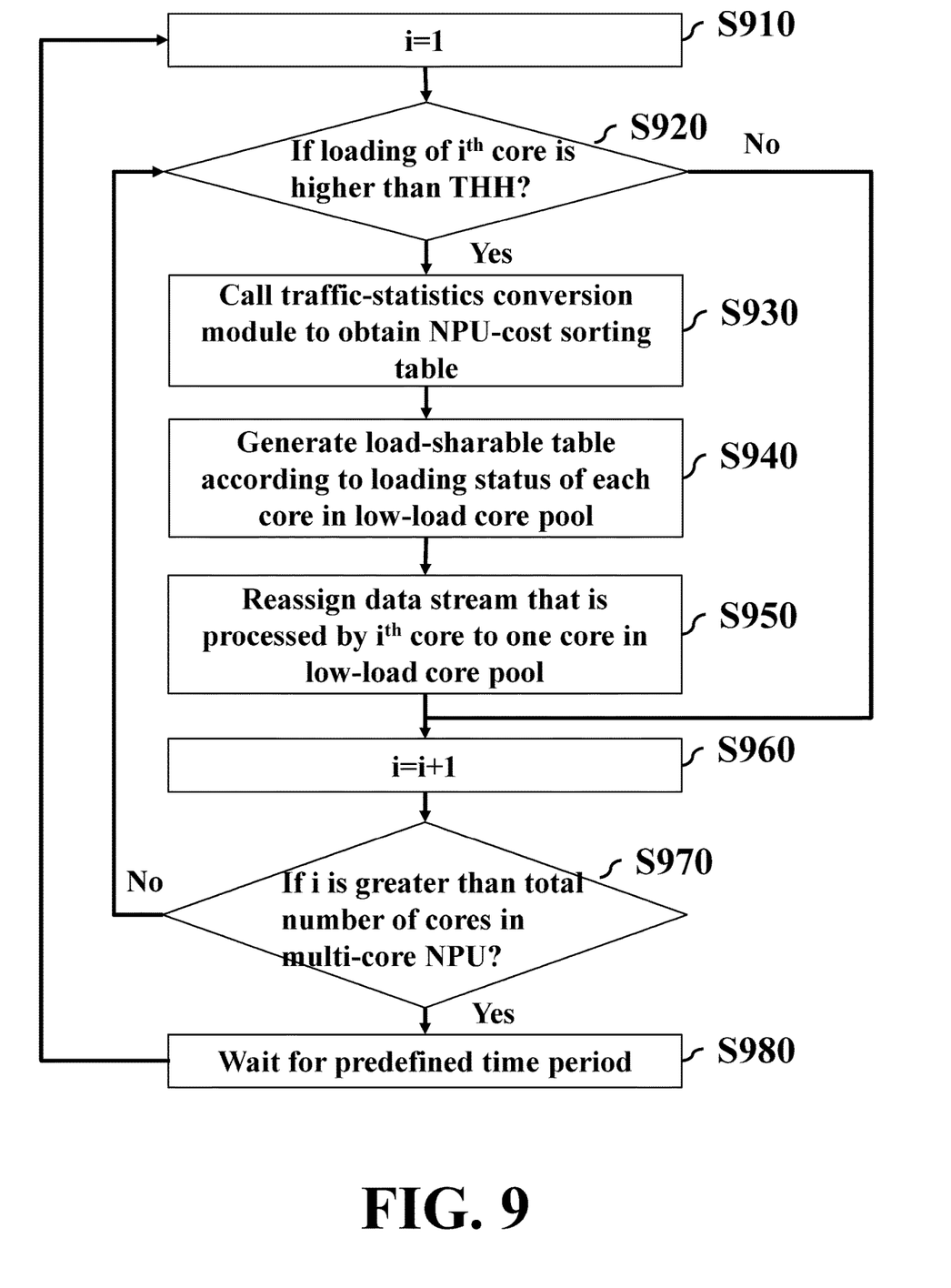
FIG. 9 is a flowchart illustrating a method for dynamically dispatching data streams according to an embodiment of the present invention.

The CPU 220 may periodically load and execute the program code of the load balancing algorithm module 410 to reassign the data streams running on the high-load cores in the multi-core NPU 210 to the cores in the low-load core pool, where each data stream is distinguished from the others by at least its quintuple. Refer to FIG. 9 illustrating a method for dynamically dispatching data streams, which is practiced by the CPU 220 when loading and executing the program code of the load balancing algorithm module 410. Detailed operations are described as follows:

Step S910: The variable i is set to one. The variable i is used to record which core in the multi-core NPU 210 is being processed.

Step S920: It is determined whether the loading of the $i^{th}$ core is higher than the high-load threshold THH. If so, the process proceeds to step S930. In alternative embodiments, step S920 determines whether the loading of the $i^{th}$ core is greater than the low-load threshold THL. In alternative embodiments, the load balancing algorithm module 410 calls the low-load core pool and deduces which cores whose loading are higher than the low-load threshold THL according to the IDs recorded in the low-load core poll, rather than performing a load-threshold comparison. Otherwise, the process proceeds to step S960. The load balancing algorithm module 410 may complete the above determination by searching the exemplary core loading table as shown in FIG. 3.

Step S930: The traffic-statistics conversion module 450 is called to obtain the NPU-cost sorting table. The traffic-statistics conversion module 450 may directly reply with the latest NPU-cost sorting table, or after performing the method as shown in FIG. 8, reply with the updated NPU-cost sorting table.

Step S940: A load-sharable table is generated according to the loading of each core in the low-load core pool. The shareable load of each core in the low-load core pool may be calculated by the formula as follows:

$$S_i = THL - L_i, i=1,2,\ldots,A$$

$S_i$ indicates the sharable load (in percentage) of the $i^{th}$ core in the low-load core pool; THL indicates the low-load threshold; $L_i$ indicates the loading of the $i^{th}$ core in the low-load core pool; i is an integer ranging from 1 to A; A indicates the total number of the cores in the low-load core pool. The load-sharable table is shown in Table 9 as an example:

TABLE 9

| Core ID | Sharable Load (%) |
|---|---|
| 4 | 30 |
| 5 | 25 |

Step S950: A data stream that is processed by the $i^{th}$ core is reassigned to one core in the low-load core pool. Specifically, the load balancing algorithm module 410 may search the NPU-cost sorting table as shown in Table 8 for the entries associated with the data streams related to the $i^{th}$ core. For each found entry, the exemplary load-sharable table as shown in Table 9 is searched for the $x^{th}$ core that can be shared. For example, since the core 212 #2 is the high-load core and Table 8 shows the NPU cost (usage rate) of the data stream indexed as 1520 that is running on the core 212 #2 is 21%, which is lower than the sharable load 25% of the core 212 #5 as shown in FIG. 9, the data stream indexed as 1520 that is running on the core 212 #2 can be reassigned to the core 212 #5. To reflect the new assignment, the load balancing algorithm module 410 updates the stream-forward table 330, the core loading table and the load-sharable table. For example, the stream-forward table 330 as shown in Table 2 is updated with Table 10 as an example:

TABLE 10

| Stream Index | Import SIP/SP | Import DIP/DP | Protocol Type | Forward Interface |
|---|---|---|---|---|
| 1520 | 192.168.1.3/36692 | 192.168.50.81/4789 | VXLAN | #5 |
| 2273 | 192.168.1.10/35336 | 192.168.40.2/1701 | L2TP | #1 |
| 1530 | 192.168.100.30/36692 | 192.168.50.81/4789 | VXLAN | #3 |

Since the data stream indexed as 1520 has been reassigned to the core 212 #5 from the core 212 #2, the frame engine 300 forwards the forthcoming packets with the same SIP, SP, DIP, DP and tunneling protocol type as that of the data stream indexed as 1520 to the core 212 #5 to process. The core loading table as shown in Table 3 is updated with Table 11 as an example:

TABLE 11

| Core ID | Core-loading Status (%) |
|---|---|
| 1 | 63 |
| 2 | 49 |
| . | . |
| . | . |
| . | . |
| 5 | 31 |
| . | . |
| . | . |
| . | . |
| n | 89 |

The load-sharable table as shown in Table 9 is updated with Table 12 as an example:

TABLE 12

| Core ID | Sharable Load (%) |
|---|---|
| 4 | 30 |
| 5 | 4 |

Step S960: The variable i is increased by one.

Step S970: It is determined whether the variable i is greater than the total number of cores in the multi-core NPU 210. If so, the process proceeds to step S980. Otherwise, the process proceeds to step S920 for the next core in the multi-core NPU 210.

Step S980: The process waits for a predefined time period.

Some or all of the aforementioned embodiments of the method of the invention may be implemented in a computer program, such as a driver of a dedicated hardware, an application in a specific programming language, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

Although the embodiment has been described as having specific elements in FIGS. 1 to 4, it should be noted that additional elements may be included to achieve better performance without departing from the spirit of the invention. Each element of FIGS. 1 to 4 is composed of various circuitries and arranged to operably perform the aforementioned operations. While the process flows described in FIGS. 5 to 9 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for load balancing of a network processing unit (NPU), performed by a central processing unit (CPU), wherein the CPU is coupled to the NPU and the NPU comprises a plurality of cores, the method comprising:
   reassigning a data stream processed by a first core in the NPU, which is under a high load, to a second core in the NPU, which is under a low load, wherein the low load is lower than the high load,
   wherein the data stream is defined by a quintuple, and the quintuple is composed of a source Internet Protocol (IP) address, a source port, a destination IP address, a destination port and a protocol type,
   wherein an NPU cost of the data stream is lower than a sharable load of the second core,
   wherein the NPU cost of the data stream is calculated based on a data rate of the data stream.

2. The method of claim 1, comprising:
   selecting the second core from a plurality of cores in a low-load core pool, wherein a loading of each core in the low-load core pool is lower than a load threshold, and the load threshold is set to 50% or a loading average of all cores in the NPU.

3. The method of claim 2, wherein the NPU cost of the data stream is calculated by a formula as follows:

$C = Fr/MAXp$

C indicates the NPU cost of the data stream; Fr indicates the data rate of the data stream; MAXp indicates maximum capacity for processing packets with a protocol type corresponding to the data stream,
   wherein the sharable load of the second core is calculated by a formula as follows:

$S = TH - L$

S indicates the sharable load of the second core; TH indicates the load threshold; L indicates a loading of the second core.

4. The method of claim 3, wherein the data rate of the data stream is calculated by a formula as follows:

$Fr = (Cnt_{t(j)} - Cnt_{t(j-1)})/TI$

Fr indicates the data rate of the data stream; $Cnt_{t(j)}$ indicates a quantity of packets of the data stream that have been forwarded at a current time point; $Cnt_{t(j-1)}$ indicates a quantity of packets of the data stream that have been forwarded at a previous time point; TI indicates a time interval from the previous time point to the current time point.

5. The method of claim 2, wherein the loading of each core is obtained by querying the NPU.

6. The method of claim 1, comprising:
updating an entry in a stream-forward table to change an assignment of the data stream from the first core to the second core, thereby enabling forthcoming packets with the same source IP address, source port, destination IP address, destination port and protocol type as that of the data stream to be forwarded to the second core to process.

7. A non-transitory computer-readable storage medium having stored therein program code that, when loaded and executed by a central processing unit (CPU) being coupled to a network processing unit (NPU) comprising a plurality of cores, causes the CPU to:
reassign a data stream processed by a first core in the NPU, which is under a high load, to a second core in the NPU, which is under a low load, wherein the low load is lower than the high load,
wherein the data stream is defined by a quintuple, and the quintuple is composed of a source Internet Protocol (IP) address, a source port, a destination IP address, a destination port and a protocol type,
wherein an NPU cost of the data stream is lower than a sharable load of the second core,
wherein the NPU cost of the data stream is calculated based on a data rate of the data stream.

8. The non-transitory computer-readable storage medium of claim 7, wherein the program code that, when loaded and executed by the CPU, causes the CPU to:
select the second core from a plurality of cores in a low-load core pool, wherein a loading of each core in the low-load core pool is lower than a load threshold, and the load threshold is set to 50% or a loading average of all cores in the NPU.

9. The non-transitory computer-readable storage medium of claim 8, wherein the NPU cost of the data stream is calculated by a formula as follows:

$$C=Fr/MAXp$$

C indicates the NPU cost of the data stream; Fr indicates the data rate of the data stream; MAXp indicates maximum capacity for processing packets with a protocol type corresponding to the data stream,
wherein the sharable load of the second core is calculated by a formula as follows:

$$S=TH-L$$

S indicates the sharable load of the second core; TH indicates the load threshold; L indicates a loading of the second core.

10. The non-transitory computer-readable storage medium of claim 9, wherein the data rate of the data stream is calculated by a formula as follows:

$$Fr=(Cnt_{t(j)}-Cnt_{t(j-1)})/TI$$

Fr indicates the data rate of the data stream; $Cnt_{t(j)}$ indicates a quantity of packets of the data stream that have been forwarded at a current time point; $Cnt_{t(j-1)}$ indicates a quantity of packets of the data stream that have been forwarded at a previous time point; TI indicates a time interval from the previous time point to the current time point.

11. The non-transitory computer-readable storage medium of claim 7, wherein the program code that, when loaded and executed by the CPU, causes the CPU to:
update an entry in a stream-forward table to change an assignment of the data stream from the first core to the second core, thereby enabling forthcoming packets with the same source IP address, source port, destination IP address, destination port and protocol type as that of the data stream to be forwarded to the second core to process.

12. An apparatus for load balancing of a network processing unit (NPU), comprising:
the NPU, comprising a plurality of cores; and
a central processing unit (CPU), coupled to the NPU, arranged operably to: reassign a data stream processed by a first core in the NPU, which is under a high load, to a second core in the NPU, which is under a low load, wherein the low load is lower than the high load,
wherein the data stream is defined by a quintuple, and the quintuple is composed of a source Internet Protocol (IP) address, a source port, a destination IP address, a destination port and a protocol type,
wherein an NPU cost of the data stream is lower than a sharable load of the second core,
wherein the NPU cost of the data stream is calculated based on a data rate of the data stream.

13. The apparatus of claim 12, wherein the CPU is arranged operably to select the second core from a plurality of cores in a low-load core pool, wherein a loading of each core in the low-load core pool is lower than a load threshold, and the load threshold is set to 50% or a loading average of all cores in the NPU.

14. The apparatus of claim 13, wherein the CPU is arranged operably to obtain the loading of each core by querying the NPU.

15. The apparatus of claim 12, wherein the NPU cost of the data stream is calculated by a formula as follows:

$$C=Fr/MAXp$$

C indicates the NPU cost of the data stream; Fr indicates the data rate of the data stream; MAXp indicates maximum capacity for processing packets with a protocol type corresponding to the data stream,
wherein the sharable load of the second core is calculated by a formula as follows:

$$S=TH-L$$

S indicates the sharable load of the second core; TH indicates the load threshold; L indicates a loading of the second core.

16. The apparatus of claim 15, wherein the data rate of the data stream is calculated by a formula as follows:

$$Fr=(Cnt_{t(j)}-Cnt_{t(j-1)})/TI$$

Fr indicates the data rate of the data stream; $Cnt_{t(j)}$ indicates a quantity of packets of the data stream that have been forwarded at a current time point; $Cnt_{t(j-1)}$ indicates a quantity of packets of the data stream that have been forwarded at a previous time point; TI indicates a time interval from the previous time point to the current time point.

17. The apparatus of claim 12, wherein the CPU is arranged operably to update an entry in a stream-forward table to change an assignment of the data stream from the first core to the second core, thereby enabling forthcoming packets with the same source IP address, source port, destination IP address, destination port and protocol type as that of the data stream to be forwarded to the second core to process.

\* \* \* \* \*